United States Patent [19]

Ralph

[11] Patent Number: 5,272,016
[45] Date of Patent: Dec. 21, 1993

[54] MULTILAYER STRETCH/SHRINK FILM

[75] Inventor: Donald J. Ralph, Orland Park, Ill.

[73] Assignee: Viskase Corporation, Chicago, Ill.

[21] Appl. No.: 20,890

[22] Filed: Feb. 19, 1993

Related U.S. Application Data

[63] Continuation of Ser. No. 855,409, Mar. 23, 1992, abandoned.

[51] Int. Cl.$^5$ ............................................. B32B 27/08
[52] U.S. Cl. ................................ 428/516; 428/34.9;
428/349; 428/910
[58] Field of Search ................. 428/516, 34.9, 349, 428/910

[56] References Cited

U.S. PATENT DOCUMENTS

| | | | |
|---|---|---|---|
| 3,456,044 | 7/1969 | Pahlke | 428/35 |
| 3,741,253 | 6/1973 | Brax et al. | 428/34.9 |
| 4,469,753 | 9/1984 | Yoshimura et al. | 428/475.8 |
| 4,617,241 | 10/1986 | Mueller | 428/520 |
| 4,640,856 | 2/1987 | Ferguson et al. | 428/36 |
| 4,714,638 | 12/1987 | Lustig et al. | 428/35 |
| 4,801,652 | 1/1989 | Mizutani et al. | 525/240 |
| 4,863,769 | 9/1989 | Lustig et al. | 428/34.9 |

FOREIGN PATENT DOCUMENTS

| | | |
|---|---|---|
| 982923 | 2/1976 | Canada. |
| 120503 | 10/1984 | European Pat. Off. |
| 0351744 | 1/1990 | European Pat. Off. |
| 410792 | 1/1991 | European Pat. Off. |
| 0450088 | 10/1991 | European Pat. Off. |
| 0510213 | 10/1992 | European Pat. Off. |
| 2003903-B | 1/1992 | Japan. |
| WO9214784 | 9/1992 | PCT Int'l Appl. |
| 2012282 | 7/1979 | United Kingdom. |

OTHER PUBLICATIONS

Proceedings of Future-Pak '91, Ninth International Ryder Conference on Food Packaging Innovations, Oct. 2-4, 1991, "Easy Peelable Ltd Material", H. Shigemoto and M. Sugi, pp. 293, 295, 297, 299-316.

"Tafmer A/P", Mitsui Petrochemical Industries, Ltd., 12 pages printed Feb. 1990.

"Tamfer", Mitsui Petrochemical Industries, Ltd., 20 pages, undated.

Japanese Patent Application Publication No. 3903/1992 which is Public Disclosure (Kokai) No. 94753/1986 laid open to public May 13, 1986 based on Patent Application No. 217565/1984 filed Oct. 16, 1984. Inventors: Nobuya Ishiguro et al., Applicant: Okura Industrial Co., Ltd.

*Primary Examiner*—Edith Buffalow
*Attorney, Agent, or Firm*—John C. LeFever

[57] ABSTRACT

A biaxially oriented heat shrinkable multilayer stretch film useful as a trayed poultry overwrap includes outer layers each comprising a blend of VLDPE (density below about 0.914 g/cm$^3$ and an ethylene alpha-olefin plastomer (density below about 0.90 g/cm$^3$).

29 Claims, No Drawings

MULTILAYER STRETCH/SHRINK FILM

This application is a continuation of prior U.S. application Ser. No. 07/855,409, filing date Mar. 23, 1992 is now abandoned.

FIELD OF THE INVENTION

This invention relates to an improved biaxially oriented heat-shrinkable multilayer film and a hermetically sealed and evacuated food package of the trayed poultry type wherein the film is in the stretched heat shrink condition as an overwrap.

BACKGROUND OF THE INVENTION

For many years, food products such as fresh poultry were shipped in bulk from the food processors to supermarkets where the bulk pieces were divided into small quantities and repackaged for retailing. For example, fresh poultry was cut up, placed on cardboard or plastic trays, and covered with stretch film secured to the tray by tack welding.

For improved efficiency the current trend is to perform the retail packaging operation in the food processing plant and ship the small retail packages from such plants to the retailers. There is also a trend towards evacuating and hermetically sealing the food retail packages in the central food processing plants, due to the longer storage time between retail packaging and consumer use. Such packaging increases the shelf life of the food packages. Also, there is a need for increased abuse resistant food retail packages because of the more frequent handling, impact and abrasion inherent in the above-described food processing plant retail packaging system.

The most commonly used film in the trayed food overwrap market is polyvinyl chloride (PVC). This thermoplastic polymer has been used because of satisfactory elongation and elastic memory. The elastic PVC contracts as the trayed food loses moisture and the food itself contracts. In some instances the result is a tight package which becomes leaky and thereby unattractive. This is because the PVC material in overwrapped trays is tack welded to itself, and not hermetically sealed. As the PVC contracts, leaks may develop between the tack welds. As a consequence, fluids which exude from overwrapped food (e.g. meats), may emerge from the package. This problem cannot be solved by hermetically sealing because of a very narrow sealing temperature range between which the seal is effective (at the low temperature end) and "burn through" or melting of the PVC (at the high temperature end). This range is so limited as to be impractical with many commercially employed heat sealing systems.

Another limitation of PVC tray overwrap material is its poor resistance to physical abuse. The PVC material tends to tear along the edges of the overwrapped tray if rubbed during transit by another tray or an enclosing carton.

One characteristic of PVC is that although it contracts, it is not "heat-shrinkable", i.e. it is not a material which will tend to return to its original unstretched (unextended) dimension when heated to its softening point. The terms "orientation" or "oriented" are used to describe the manufacture of heat-shrinkable films, wherein resin material is heated to its flow or melting point and extruded through a die into either tubular or sheet form. After cooling, the relatively thick extrudate is reheated to a temperature range suitable to orient or align the crystallites and/or molecules of the material. The orientation temperature range for a given material or materials is understood by those skilled in the art to be in a range which revises the inter-molecular configuration of the material by physical alignment of the crystallites and/or molecules of the material to improve certain mechanical properties of the film such as shrink tension, as for example measured in accordance with ASTM D-2838-81. When the stretching force is applied in one direction, uniaxial orientation results. When the stretching force is simultaneously applied in two directions, biaxial orientation results.

In view of the aforementioned limitations of PVC as a stretch film food tray overwrap material, there have been prior efforts to identify a heat-shrinkable thermoplastic film having an improved combination of elongation, elastic memory, heat sealability and puncture resistance. However, most heat-shrinkable thermoplastic film packaging materials suitable for food contact have relatively poor elasticity or elastic memory. Thus, when a food wrapped in such a material shrinks from moisture loss, the film does not shrink and a loose package results which is asthetically unpleasing.

One heat-shrinkable biaxially oriented film which has been commercially employed in the trayed food overwrap market is a five layer film designated by its manufacturer, W. R. Grace & Co.—Conn. as SSD-310. This polyolefin-containing composition provides many of the aforedescribed characteristics, but when used to hermetically seal the food-containing tray after evacuation, the power consumption of the impulse and heat sealing equipment is relatively high. This is in part because the SSD-310, due to its particular construction, must be irradiatively cross-linked for satisfactory bubble stability during biaxial orientation, and also for satisfactory abuse resistance. Another reason for the high power consumption is that the SSD-310 film requires a high sealing temperature on the order of 350°–430° F., which in turn requires a long dwell time.

Another important film property for food tray overwrap applications is low permanent deformation, which is a measure of the film's increase in length after stretching and relaxation. More particularly, the permanent deformation test used herein is derived from ASTM 621 and measures the percent increase in length of a film sample stretched 50% and then allowed to relax for 30 seconds. Lower percentage values reflect the ability of a film to relax after being stretched. In tray overwrap applications, good film recovery preserves package appearance and integrity following handling abuse. Perfect elastomers would have 0% permanent deformation. Plasticized PVC has 3-5% deformation, while polyolefins such as LLDPE generally have significantly higher permanent deformation, on the order of 6-15%.

One object of this invention is to provide an improved heat-shrinkable oriented stretch film suitable for use as a trayed food overwrap material.

Another object of this invention is to provide such a film which is capable of forming a hermetically sealed trayed food package as a stretch overwrap material.

Still another object is to provide such a film having high abuse resistance.

A further object is to provide such a heat-shrinkable oriented stretch film in the form of five or less multiple layers.

A still further object is to provide a stretch film which can be biaxially oriented without irradiative cross-linking.

An additional object is to provide such a film which can be hermetically sealed as a stretch wrap material around a food-containing tray at lower temperature and with less energy than heretofore required.

Another object is to provide a polyolefin-containing heat-shrinkable oriented multiple layer stretch film having low permanent deformation.

A still additional object of this invention is to provide an improved evacuated, hermetically sealed food-containing tray package overwrapped by a heat shrunk film.

Another object is an improved method for forming an evacuated, hermetically sealed high abuse resistant tray food package with a heat shrunk plastic film overwrap.

Other objects and advantages of this invention will be apparent from the ensuing disclosure and appended claims.

SUMMARY OF THE INVENTION

One aspect of this invention relates to a biaxially oriented heat-shrinkable multilayer stretch film comprising at least a first outer layer, a second outer layer, and a core layer between the first and second outer layers. The first and second outer layers each comprise a blend of between about 20 and about 35 weight % ethylene alpha-olefin plastomer copolymer of density below about 0.90 g/cm$^3$, and between about 65 and about 80 weight % VLDPE of density below about 0.914 g/cm$^3$. The term "ethylene alpha-olefin plastomer" is described further herein below. The core layer comprises ethylene alpha-olefin copolymer having a higher melting point than the melting points of either of the first and second outer layer. As used herein, "heat-shrinkable" means that the film has at least 20% free shrink at 90° C. measured in at least one direction, i.e. machine or transverse, in accordance with ASTM D-2732.

Another aspect of the invention relates to a hermetically sealed and evacuated food package comprising a tray with a bottom section surrounded by upwardly extending side walls, perishable food supported on the upper surface of the bottom section, and a stretched heat shrink film extending over each of the food, the upper edges of the side walls and at least part of the lower surface of the tray bottom section and heat sealed to itself in flattened relationship against the lower surface so as to form with the tray a hermetically sealed enclosure for the food. In this aspect of the invention, the improvement is a biaxially oriented multilayer composition as the stretched heat shrink film comprising at least a first outer layer, a second outer layer and a core layer between the first and second outer layers. Each of the first and second outer layers comprises a blend of between about 20 and about 35 weight % ethylene alpha plastomer copolymer of density below about 0.90 g/cm$^3$, and between about 65 and about 80 weight % VLDPE of density below and about 0.914 g/cm$^3$, The core comprises ethylene alpha-olefin copolymer having a higher melting point than the melting points of either of the first and second outer layers.

DETAILED DESCRIPTION OF THE INVENTION

The multilayer stretch film of this invention requires at least three layers: a first outer layer, a second outer layer and a core layer between the first and second outer layers. This film is used to enclose perishable products such as food, and for storage the enclosure must be evacuated and hermetically sealed. The sealing is by heat, i.e. the film enclosure is heated to a range between the heat seal initiation temperature and the burn-through temperature. More specifically to obtain an effective heat seal the film is heated to at least a temperature approximating the melting point of the first or second outer layer forming the inside layer of the perishable product-enclosing package. Since these layers comprise a mixture of two types of ethylene alpha-olefins which approach true homogeneous blends, the melting point(s) of the blend approximate a temperature intermediate those of the two major (ethylene alpha-olefin) components, and based on a linear relationship reflecting the relative proportions of the components.

If the core layer melting point were equal to or below the melting point of the package-enclosing inner layer, the entire multilayer film would become so molten that it would have very little strength and the heating means would penetrate all three layers and cut, i.e. burn through, the film. This problem is avoided by employing a core layer having a melting point higher than the melting point(s) of the first and second layers. Accordingly, the core layer does not melt when the inside layer is heated to its melting point for heat sealing, and the multilayer film retains its strength and integrity as a heat sealed but shrunken film enclosure.

Very low density polyethylene (hereinafter VLDPE) is also called "ultra low density polyethylene" (ULDPE) and comprises copolymers of ethylene with alpha-olefins, usually 1-butene, 1-hexene or 1-octene, and in some instances terpolymers, as for example of ethylene, 1-butene and 1-octene. As used herein VLDPE also includes terpolymers of ethylene and higher alpha-olefin comonomers. VLDPE's have lower densities than, and are a different class of materials from linear low density polyethylene (LLDPE) and are recognized by those skilled in the art to range between about 0.86 and about 0.914 g/cm$^3$. A process for making VLDPE's is described in European Patent Document publication number 120,503 whose text and drawing are hereby incorporated by reference into the present document.

As for example described in U.S. Pat. Nos. 4,640,856 and 4,863,769, VLDPEs are capable of use in biaxially oriented films which have superior properties to comparable films with LLDPE's. These superior properties include higher shrink, higher tensile strength and greater puncture resistance.

VLDPE's are commercially available in dry resin form either as powder or granules, and for example manufactured and sold by Union Carbide Corporation and Dow Chemical Corporation.

Ethylene alpha-olefin copolymers are also manufactured with elastomeric properties and are hereinafter referred to as "ethylene alpha-olefin plastomers". Some of these have densities in the same range as VLDPE's, but have greatly different physical properties due to differences in manufacturing processes. For example, it appears that ethylene alpha-olefin plastomers and VLDPE are manufactured with different catalyst systems. One manufacturer of these materials is Mitsui Petrochemicals Ltd., and they sell ethylene-butene plastomer copolymers under the name "Tafmer". It is interesting to note that Mitsui manufactures and sells both ethylene alpha-olefin plastomers and also materials they characterize as VLDPE's, and the two types of materials are manufactured in different plants using different catalyst systems. Mitsui describes the differences between the two types of ethylene alpha-olefin copolymers in the "Proceedings of Future-Pak '91, Ninth International Ryder Conference on Food Packaging Innovations", Oct. 2–4, 1991. According to U.S. Pat. No. 4,469,753, Tafmers are copolymers of ethylene and butene-1. As used herein, ethylene alpha-olefin plastomers include terpolymers of ethylene and higher alpha-olefin comonomers.

As hereinafter discussed in detail, VLDPE and ethylene alpha-olefin plastomer may be compared in terms of crystallinity, Vicat softening points, molecular weight/size distribution, and tensile properties. For purposes of this invention, they are broadly distinguished on he basis of at least the following properties in the resin form:

| Property | VLDPE | Ethylene Alpha Olefin Plastomers |
|---|---|---|
| Melting Point | At least about 90° C. | Below about 90° C. if any melting point |
| Molecular weight/size distribution (ASTM D-3593-80) | Above about 3 | Below about 3 |
| Crystallinity (measured by DSC) | At least two crystalline phases with the dominant phase having a melting point of between about 100° C. and about 125° C. | Entire crystalline phase melts below about 90° C. |

Depending on the melting points of the first and second outer layers, the higher melting core layer may for example be VLDPE, LLDPE, polypropylene, ethylene-propylene copolymer butene-1, or a blend of at least two ethylene alpha-olefins such as a lower density and a higher density material.

As will be explained hereinafter in more detail, this three-layer film overcomes the aforedescribed limitations of biaxially oriented heat-shrinkable films as a PVC replacement in overwrapping trayed foods, performs as well as he commercially employed five-layer films, requires about one half the power needed to hermetically seal evacuated trayed food packages, and provides higher seal strength under equivalent sealing conditions. Moreover, this three layer film has been demonstrated to provide an unexpected combination of high shrink values and low permanent deformation percentages. All of these properties are advantages in food packaging and use applications and especially for the previously described food processing plant retail packaging system for stretch wrapping trayed food with plastic film.

A preferred ethylene alpha-olefin plastomer in the practice of this invention is Tafmer A-4085 manufactured as a butene-ethylene copolymer by Mitsu Petrochemical Industries Ltd. Other suitable ethylene alpha-olefin plastomers include the Tafmer types A-4090, A-1085, P-0480 and P-0680 also manufactured by Mitsui. According to the manufacturer, the P-type Tafmers are non crystalline whereas the A-type Tafmers have low crystallinity and are a little higher in tensile properties because of this characteristic. These materials are described in the Mitsui publication "Tafmer A/P" as well the aforementioned "Proceedings of Future-Pak 91" publication. According to the manufacturer, these ethylene alpha-olefin plastomer copolymers have the physical properties in resin form summarized in Table A.

TABLE A

Ethylene Alpha Olefin Plastomers

| Type | Manufacturer | Property | Units | Value |
|---|---|---|---|---|
| A-4085 | Mitsui | Melt Index (D-1238) | g/10 min (190° C.) | 3.6 |
| | | Density (D-1505) | g/cc | 0.88 |
| | | Vicat Soften Pt. (D-1525) | °C. | 54 |
| | | Tensile Strength At Break (515 K 6301) | kg/cm$^2$ | 270 |
| | | Elongation At Break (515 K 6301) | % | 800 |
| | | Mw/Mn | none | 2.35 |
| A-4090 | Mitsui | Melt Index (D-1238) | g/10 min (190° C.) | 3.6 |
| | | Density (D-1505) | g/cc | 0.89 |
| | | Vicat Soften Pt. (D-1525) | °C. | 60 |
| | | Tensile Strength At Break (515 L 6301) | kg/cm$^2$ | 320 |
| | | Elongation At Break (515 K 6301) | % | 700 |
| | | Mw/Mn | none | 2.0 |
| A-1085 | Mitsui | Melt Index (D-1238) | g/10 min (190° C.) | 1.4 |
| | | Density (D-1505) | g/cc | 0.885 |
| | | Vicat Soften Pt. (D-1525) | °C. | 58 |
| | | Tensile Strength At Break (515 K 6301) | kg/cm$^2$ | 340 |
| | | Elongation At Break (515 K 6301) | % | 710 |
| | | Mw/Mn | none | 2.0 |

The aforementioned Tafmer A-4085 is preferred for end uses wherein the inventive film's optical properties are important, as for example the aforedescribed stretch overwrapping trayed food products. The basis for this preference is higher gloss and lower haze under equivalent conditions, and this was demonstrated in a series of tests wherein blown (non oriented, non heat-shrinkable) film was prepared from several formulations comprising 85% VLDPE (density 0.906 g/cm$^3$, melt index 0.8) and 15% ethylene alpha-olefin plastomer copolymer. The latter comprised each of three Tafmer materials, and the properties were compared with those of 100% VLDPE. In these tests the extrusion temperature was 334°–341° F., the die size was 2½ inch × 0.0315 inch, and the resulting blown film tubes had flat width of 10.125–10.5 inch. The results are summarized in Table B.

TABLE B

Comparison of Plastomer Optical Properties

| Property | 100% VLDPE | 15% P-0480 | 15% P-0680 | 15% A-4085 |
|---|---|---|---|---|
| Film Thickness, avg. | 83 | 97 | 88 | 97 |

TABLE B-continued
Comparison of Plastomer Optical Properties

| Property | 100% VLDPE | 15% P-0480 | 15% P-0680 | 15% A-4085 |
|---|---|---|---|---|
| (mils × 100) Tensile Strength, psi | | | | |
| MD | 9,595 | 6,454 | 5,740 | 7,217 |
| TD | 7,910 | 6,540 | 6,062 | 6,457 |
| Elongation, % | | | | |
| MD | 793 | 696 | 714 | 651 |
| TD | 945 | 897 | 819 | 988 |
| Secant Modulus* (PSI × 100) | | | | |
| MD | 6,818 | 8,045 | 6,818 | 7,608 |
| TD | 7,142 | 7,894 | 10,000 | 8,536 |
| Haze, % | 10.5 | 7.4 | 9.6 | 3.7 |
| Gloss, H.U.** | 50.8 | 67.1 | 58.9 | 72.4 |
| Permanent Deformation, % | | | | |
| MD | 4.2 | 3.2 | 3.1 | 3.8 |
| TD | 3.4 | 2.8 | 3.0 | 3.0 |

*Measured at 1% elongation
**Hunter Units

Table B shows that the percent haze is considerably lower and the percent gloss is considerably higher for the 15% Tafmer A-4085 containing film than for the comparable Tafmer P-0480 and Tafmer P-0680 containing films, or for the 100% VLDPE film. Even through these were blow films, it may be concluded from these test that from a qualitative standpoint, the optical properties of a biaxially oriented heat-shrinkable film of this invention using Tafmer A-4085 are superior to those of comparable films using Tafmer P-0480 or P-0680.

Suitable VLDPEs for practicing this invention include those manufactured by Dow Chemical Company and Union Carbide Corporation, and having the following physical properties in the resin form according to the manufacturers, as summarized in Table C.

TABLE C
VLDPE Physical Properties

| Type | Manufacturer | Property | Units | Value |
|---|---|---|---|---|
| 4001 | Dow (ethylene-octene copolymer) | Melt Index (D-1238) | g/10 min | 1.0 |
| | | Density (D-792) | g/cc | 0.912 |
| | | Tensile Yield (D-638) | psi | 1200 |
| | | Ultimate Tensile (D-638) | psi | 3500 |
| | | Ult. Elongation (D-638) | % | 850 |
| | | Vicat Soften. Pt. (D-1525) | °C. | 95 |
| | | Mw/Mn (ASTM D-3593) | none | 5.1 (110,600/21,680) |
| 4003 | Dow (ethylene-octene copolymer) | Melt Index (D-1238) | g/10 min | 0.8 |
| | | Density (D-792) | g/cc | 0.905 |
| | | Tensile Yield (D-638) | psi | 950 |
| | | Ultimate Tensile (D-638) | psi | 3200 |
| | | Ult. Elongation (D-638) | % | 800 |
| | | Vicat Soften. Pt. (D-1525) | °C. | 80 |
| 1137 | Union Carbide (ethylene-butene copolymer) | Melt Index (D-1238) | g/10 min | 1.0 |
| | | Density (D-792) | g/cc | 0.905 |
| | | Tensile Yield (D-638) | psi | 2800 |
| | | Ultimate Tensile (D-882) | psi | — |
| | | Ult. Elongation (D-882) | % | 1720 |
| | | Vicat Soften. Pt. (D-1525) | °C. | 80 |
| | | Mw/Mn (ASTM D-3593) | none | 4.9 (125,000/25,700) |
| 1192 | Union Carbide (ethylene-butene hexene terpolymer) | Melt Index (D-1238) | g/10 min | 0.19 |
| | | Density (D-792) | g/cc | 0.912 |
| | | Tensile Strength (D-882) | psi | 7100 (MD) 5000 (TD) |
| | | Ult. Elongation (D-882) | % | 400 (MD) 760 (TD) |
| | | Vicat Soften. Pt. (D-1525) | °C. | "low eighties" (reported by mfr.) |
| | | Mw/Mn (ASTM D-3593) | none | 12.2 (196,900/16,080) |

Permanent Deformation

The procedure used in the following examples for measuring permanent deformation was derived from ASTM D621 and employs an Instron table model tensile testing machine or equivalent. Four samples are tested for MD permanent deformation, and each cut to 5 inches MD length and 1 inch TD length. Likewise, four samples are tested for TD permanent deformation and each cut to 5 inches TD length and 1 inch MD length. The chart speed for both the A and B jaws is set at 20 inches/minute. The A jaws crosshead speed is set at 2 inches/minute and the B jaw crosshead speed is set at 20 inches/minute. The chart pen settings are adjusted so that the crosshead will return to gauge length of 2 inches after stretching the film 50% of its initial length, i.e. 1 inch. The B jaw speed of 20 inches/minute is run and the cross heat returns to its original position after the 50% stretch. This original position is maintained for 30 seconds. The A jaw speed of 2 inches/minute is run in like manner. When force begins to reappear on the chart, the crosshead is returned to the initial gauge length. The chart is read in inches, from the beginning of the test to where force reappears, i.e. the pen leaves the baseline. The percent permanent deformation is obtained by multiplying the inches on the chart by 5. The procedure is repeated with the remaining samples, and an arithmatic average is calculated. The procedure is otherwise identical to ASTM 621.

Shrinkage

The biaxially oriented stretch film of the present invention are "heat-shrinkable", and as used herein this means the film has an unrestrained shrinkage of at least 20 percent in both the machine and transverse directions at 90° C. Shrinkage values are obtained by measuring unrestrained shrink of the stretch film at 90° C. for five seconds. Four test specimens are cut from a given sample of the oriented film to be tested. The specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen. The shrinkage for the four specimens is averaged for the MD shrinkage values of the given film sample, and the shrinkage for the four specimens averaged for the TD shrinkage value.

Shrink Force

The shrink force of a film is that force or stress required to prevent shrinkage of the film and was determined from film samples taken from each film. Four film samples were cut 1 inch (2.54 cm.) wide by 7 inches (17.8 cm.) long in the machine direction and 1 inch (2.54 cm.) wide by 7 inches (17.8 cm.) long in the transverse direction. The average thickness of the film samples was determined and recorded. Each film sample was then secured between two clamps spaced 10 cm. apart. One clamp is a fixed position and the other is connected to a strain gauge transducer. The secured film sample was then immersed in a silicone oil bath maintained at a constant elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the result is obtained in grams per mil of film thickness (g/mil):

Shrink Force (g/mil) = F/T wherein F is the force in grams and T is the average thickness of the film samples in mils.

Crystallinity

A manufacturer of both plastomer-type ethylene alpha-olefin copolymers and VLDPE reports that in general, the plastomers have lower crystallinity than VLDPE copolymers. In particular, Mitsui Petrochemical Industries Ltd. reports that their Tafmers have lower crystallinity than their VLDPE materials (ref: "Future-Pak '91, Ninth International Ryder Conference on Food Packaging Innovations", Oct. 2-4, 1991, page 314). Mitsui also plastomer ethylene alpha-olefin copolymer has 10-15% crystallinity whereas their VLDPE has 25-35% crystallinity.

Differential Scanning Calorimetry (DSC) is commonly used to measure the amount of crystallinity in a plastic sample, and it also reveals the nature of this crystallinity. As for example determined in a procedure similar to ASTM D-3418, a DSC is performed by exposing a sample of the plastic to a constant rate of heating, i.e. 50° C. per minute and a DuPont 9000 brand differential scanning colorimeter. When the temperature of a sample reaches the melting point of a crystalline region, the continued application of heat causes the crystalline fraction to melt, and during this process the sample temperature remains constant. After the crystalline region has melted, the sample temperature once again begins to rise.

DSC measurements were performed on two types of VLDPE's: the Union Carbide 1137 (an ethylene-butene copolymer) with 0.906 density and the Dow Attane 4001 (an ethylene-octene copolymer) with 0.912 density. The same type measurement was performed with Tafmer A-4085. Each of these ethylene alpha-olefin copolymers has some crystallinity but the crystalline nature of the ethylene alpha-olefin plastomer and the VLDPE copolymers is entirely different.

The entire crystalline phase of the ethylene alpha-olefin Tafmer A-4085 plastomer melts between about 55° and 85° C., and this melting point range is consistent with the crystalline phase being made up of an ordered butene-ethylene copolymer. In contrast, the VLDPE copolymers have at least two crystalline phases with the dominant phase being that of a high temperature melting point, in each instance being in the range of about 117°-125° C. This is typical of that displayed by an ethylene homopolymer, and essentially the plastic could be regarded as a composite of two copolymers: a higher ethylene alpha-olefin-ethylene copolymer and an ethylene copolymer.

The melting points of representative VLDPE and ethylene alpha-olefin copolymer plastomers are summarized in Table D.

TABLE D

| Melting Points (°C.) | |
|---|---|
| Type Compound and Manufacturer | MP (°C.) |
| Union Carbide 1137 VLDPE | 117 |
| Union Carbide 1085 VLDPE | 117 |
| Union Carbide 1063 VLDPE | 124 |
| Union Carbide 1064 VLDPE | 125 |
| Union Carbide 1092 VLDPE | 121 |
| Dow Attane 4001 VLDPE | 121 |
| Dow Attane 4003 VLDPE | 107/124 (two peaks) |
| Mitsui Tafmer A-4085 Plastomer | 71 |
| Mitsui Tafmer A-4090 Plastomer | 85 |
| Mitsui Tafmer A-1085 Plastomer | 71 |

Table D demonstrates the substantial difference in melting points of VLDPE and plastomers. More particularly, ethylene alpha-olefin copolymer plastomers have melting points below about 90° C. and VLDPE materials have melting points above about 90° C. Preferably the plastomers have melting points below about 85° C.

Based on the foregoing, preferred VLDPE copolymers have a crystalline melting point between about 100° C. and less than about 125° C. Resins having a crystalline melting point above about 125° C. are, with rising temperature, increasingly difficult to process as biaxially oriented heat-shrinkable food packaging stretch films. VLDPE resins useful in the outer layer blends of the inventive film preferably have a crystalline melting point between about 115° C. and about 125° C.

Vicat Softening Point

As previously explained, VLDPE materials tend to be less flexible and harder to penetrate than plastomer-type ethylene alpha-olefins, which tend to be more flexible and softer. This is illustrated by comparing Vicat softening points for the two kinds of copolymers. As defined in ASTM 1525, Vicat softening point is the temperature at which a flat-ended needle of 1-mm² circular cross section will penetrate a thermoplastic specimen to a depth of 1 mm. under a specified load using a selected uniform rate of temperature rise. Vicat softening points for various VLDPE's and plastomer-type ethylene alpha-olefins have been reported by the resin manufacturers and are summarized in Table E as follows.

TABLE E

| Type Compound and Manufacturer | Vicat Softening Point VSP (°C.) per ASTM-1525 |
|---|---|
| Union Carbide 1085 VLDPE | 45 |
| Union Carbide 1137 VLDPE | 80 |
| Union Carbide 1063 VLDPE | 93 |
| Union Carbide 1064 VLDPE | 90 |
| Union Carbide 1569 VLDPE | 94 |
| Dow Attane 4001 VLDPE | 95 |
| Dow Attane 4003 VLDPE | 80 |
| Dow Attane 4004 VLDPE | 92 |
| Mitsui Tafmer A-1085 Plastomer | 58 |
| Mitsui Tafmer A-4085 Plastomer | 54 |
| Mitsui Tafmer A-4090 Plastomer | 65 |
| Mitsui Tafmer A-20090 Plastomer | 60 |

It will be noted that Union Carbide 1085 material has a much low vicat softening point than other VLDPEs, but is still considered a VLDPE because of its other properties.

Based on the foregoing and for purposes of this invention, VLDPE-type ethylene alpha-olefin copolymers preferably have Vicat softening points of at least about 68° C., and most preferably between about 78° C. and about 100° C. Conversely, plastomer-type ethylene alpha-olefin copolymers preferably have Vicat softening points below about 68° C. and most preferably between about 50° C. and about 65° C.

Molecular Weight/Size Distribution

Ethylene alpha-olefin copolymers may be partially characterized by their weight average molecular weight (Mw) which is determined by multiplying the weight of each chain of a given number of repeat units by the number of such chains and dividing by the total weight of chains. Ethylene alpha-olefin copolymers may also be partially characterized by a number average molecular weight (Mn), which is derived from the total weight of polymer molecules divided by the total number. When both of these are known, they can be used to characterize the shape of the molecular weight distribution curve for the copolymer, i.e., the number of polymer chains in a molecular weight interval as the ordinate and the molecular weight as the abscissa. Qualitatively, a high Mw/Mn connotes a wide distribution of molecular weights whereas a low Mw/Mn connotes a narrow distribution. Mw/Mn can be measured by several different techniques, but as used herein the gel permeation chromatography ("GPC") procedure outlined in ASTM D-3593-80 is used.

In general, relatively narrow Mw/Mn distribution (and low ratio) permits sharper control of physical properties and superior optical properties, i.e. relatively high gloss and low haze. However, relatively low Mw/Mn ratio value polymers are also difficult to process. More particularly, the specific ethylene alpha-olefin plastomers known to applicant as useful in this invention are characterized by relatively narrow molecular weight distribution and Mw/Mn values below about 3. They are relatively difficult to process into films by melt extension. Although they can be melt extruded into blown film, applicant has been unable to prepare biaxially oriented heat-shrinkable film from these materials such as the aforedescribed Tafmer A-4085.

All of the specific VLDPE copolymers known to applicant and available in commercial quantities as of the application filing date have substantially wider molecular weight distribution and higher Mw/Mn values than the ethylene alpha-olefin plastomers known to applicant as being useful in practicing this invention. As such, the VLDPE copolymers have higher impact strength, tensile strength, abrasion resistance and better processing characteristics. For example, by themselves these VLDPEs may be melt extruded into a primary tube and then biaxially oriented into a heat-shrinkable tube. The molecular weight/size distribution ratios for representative commercially available ethylene alpha-olefin copolymers are set forth in the following Table F. Unless indicated otherwise, these values were measured by the GPC procedure of ASTM D-3593-80.

TABLE F

| Type Compound and Manufacturer | Molecular Weight/Size Distribution Mw/Mn |
|---|---|
| Union Carbide 1085 VLDPE (0.885 density, 0.8 MI) | 3.6 (118,000/33,000) |
| Union Carbide 1137 VLDPE (0.900 density, 1.0 MI) | 4.9 (125,000/25,700) |
| Union Carbide 1192 VLDPE (0.912 density, 0.19 MI) | 12.2 (196,000/16,080) |
| Union Carbide 1096-2 VLDPE (0.912 density, 0.38 MI) | 7.2 (137,000/19,110) |
| Dow 4001 VLDPE | 5.1 (110,600/21,680) |
| Mitsui 0.896 density VLDPE | 4.0* |
| Mitsui 0.907 density VLDPE | 3.2* |
| Mitsui Tafmer A-4090 Plastomer | 2.0* |
| Mitsui Tafmer A-4085 Plastomer | 2.35 (108,000/46,000) |
| Mitsui Tafmer A-1085 Plastomer | 2.00 (160,000/80,000) |

*Reported by manufacturer in the aforementioned "Proceedings of Future-Pak '91", page 314. Procedure for measuring Mw/Mn not identified.

Based on the commercially available ethylene alpha-olefins reported in Table F, it appears that the plastomer type has an Mw/Mn value of below about 3 whereas the VLDPE copolymers have Mw/Mn values above about 3. More particularly, the known plastomer type ethylene alpha-olefins have Mw/Mn values below about 2.5 whereas the commercially available VLDPE materials preferably have Mw/Mn values of at least about 5. However, it may be possible to manufacture VLDPE materials having relatively narrow molecular weight distributions and Mw/Mn value below about 3.

Tensile Properties

In general, known VLDPEs have higher tensile strengths than comparable ethylene alpha-olefin plastomers. That is, if the two copolymers were prepared from the same comonomer and using the same catalyst system, the VLDPE would have higher crystallinity and density, hence higher tensile strength. Mitsui, a manufacturer of both plastomers and VLDPE, reports the following values for Young's Modulus (the modulus of elasticity), which is the ratio of stress to strain below the proportional limit of a material, as summarized in Table G.

TABLE G

| Material | Young's Modulus Kg/cm² |
|---|---|
| Tafmer A-4085* | 400 |
| Tafmer A-20090* | 600 |
| VLDPE (0.896 density)** | 800 |
| VLDPE (0.907 density)** | 1820 |

*"Tafmer" publication of Mitsui Petrochemical Ind., Ltd., page 12
**"Proceedings of Future-Pak '91", page 314

Another difference in the tensile properties of ethylene alpha-olefin plastomers and VLDPE materials is that the former do not have a definitive yield point whereas most VLDPE materials do possess such a point. As defined in ASTM D-638, yield point is the first point on the stress-strain curve at which an increase in strain occurs without an increase in stress. ASTM D-638 also defines yield strength as the stress at which a material exhibits a specific limiting deviation from the proportionality of stress to strain, and unless otherwise specified, that stress will be the stress at the yield point. In the aforementioned "Future-Pak '91" publication by Mitsui, the following information is reported on page 314 for yield strengths: Tafmer A-4090 no value reported, VLDPE 0.896 g/cm$^3$ density is 42 kg/cm$^2$, and VLDPE 0.907 g/cm$^3$ density is 84 kg/cm$^2$. This indicates that in view of a manufacturer of both ethylene alpha-olefin plastomers and VLDPE, the former do not have a yield point but instead break when sufficient stress is applied. In contrast, Mitsui indicates that its VLDPE materials have definite yield points.

The Mitsui results were qualitatively confirmed in a series of tests in which samples of various resins were prepared according to the procedure for thin plastic sheeting outlined in ASTM 882-90. The dimensions of these resin samples were as follows: 1 inch width, 4 inches long and 7-9 mils thick. These samples were tested for yield point and tensile strength following Method A, employing a constant rate of separation of the grips initially holding the ends of the specimen 2 inches apart, this rate being 20 inches/min. Five samples of each material were tested and the results averaged. The results of these tests were summarized in Table H.

TABLE H

Yield Strength

| Type Compound and Manufacturer | Yield Strength (psi) |
|---|---|
| Dow Attane XU 61512.21 VLDPE (0.901 dens.) | 1020.0 |
| Dow Attane XU 61520.01 VLDPE (0.912 dens.) | 1329.2 |
| Union Carbide 1137 (0.905 dens.) | 1121.3 |
| Union Carbide 1192 (0.912 dens.) | 1323.2 |
| Union Carbide 1085 (0.885 dens.) | No yield point |
| Mitsui Tafmer A-4085 Plastomer (0.88 dens.) | No yield point |
| Mitsui Tafmer A-1085 Plastomer (0.88 dens.) | No yield point |

It will be noted that Union Carbide type 1085 VLDPE did not have a yield point, unlike the other VLDPEs but like the ethylene alpha-olefin copolymer plastomers. However, it is classified as a VLDPE because of its other properties, including a melting point of 117° C.

The biaxially oriented heat-shrinkable film of this invention may be produced by known techniques such as by coextruding at least the core layer and the first and second outer layers on each side of the core layer to form a primary tube as for example described in Canadian Patent No. 982923. Alternatively, the composite primary tube may be formed by coating lamination, wherein a first outer tubular layer is extruded and thereafter the core and second outer tubular layers are sequentially coated onto the outer surfaces of the first tubular layer and the core layer. As another alternative, the first outer and core outer layers may themselves be coextruded, and the second outer layer thereafter coated onto the outside surface of the core layer. Coating lamination procedures are described in U.S. Pat. No. 3,741,253. As still another alternative, the at least three layer film may be formed as a sheet by the well-known slot casting procedure.

If the at least three layer film has been prepared as a primary tube or converted from a primary sheet into a tube, it may be biaxially oriented by the well-known two step "double bubble" or trapped process. One such process is described in Pahlke U.S. Pat. No. 3,456,044. This involves reheating the primary tube and simultaneously stretching the tube in the machine direction ("MD") by operating longitudinally spaced nip rolls at different speeds, and stretching the tube in the transverse direction ("TD") by inflating air inside the tube. Suitable stretch ratios are from about 2 to about 6 with MD/TD ratios of about 3 to about 5 preferred.

Although not essential in the practice of this invention, it may be desirable to cross-link one or more layers of the inventive film for improved abuse and/or puncture resistance and other physical characteristics. This for example may be accomplished by irradiation using high energy electrons, ultra violet radiation, x-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR typically between about 1 MR and about 20 MR, with a preferred dosage range of about 2 MR to about 12 MR. Irradiation can be carried conveniently at room temperature, although higher and lower temperatures, for example, 0° C. to 60° C. may be employed.

Processwise, irradiation can be applied to a single substrate layer such as the first outer layer and prior to biaxial orientation if the primary multilayer film is prepared by coating lamination. This type of irradiative cross-linking is for example described in the aforementioned U.S. Pat. No. 3,741,253. Alternatively, if the entire film is simultaneously coextruded it may be preferable to irradiate the entire multilayer film, and for maximum efficiency this should be done after biaxial orientation at a dosage level below about 8 MR, as for example described in U.S. Pat. No. 4,714,638.

Cross-linking may also be accomplished chemically through utilization of peroxides, as is well known to those of skill in the art. A general discussion of cross-linking can be found at pages 331 to 414 of volume 4 of the Encyclopedia of Polymer Science and Technology, Plastics, Resins, Rubbers, Fibers published by John Wiley & Sons, Inc. and copyrighted in 1966. This document has a Library of Congress Catalog Card Number of 64-22188.

Unless otherwise noted, the resins utilized in the present invention are generally commercially available in pellet form and, as generally recognized in the art, may be melt blended or mechanically mixed by well known methods using commercially available equipment including tumblers, mixers or blenders. Also, if desired, well known additives such as processingn aids, slip agents, antiblocking agents, pigments, etc., and mixtures thereof may be incorporated into the film, by blending prior to extrusion. The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the ethylene alpha-olefin plastomer VLDPE outer layer blends of the present invention, barrel and die temperatures, for example, may range between about 305° and about 350° F. However, depending upon such factors as other resins which may be employed, the manufacturing process used and particular equipment and other process parameters utilized, variations are expected. Actual process parameters including process temperatures will be set by one skilled in the art without undue experimentation.

Advantageously, a preferred embodiment of the inventive heat-shrinkable film will have a maximum extractable portion of 5.5 percent by weight of polymer in n-hexane at 50° C. for 2 hours as further described below. This 5.5 weight percent represents the desired maximum n-hexane extractable limit for olefin copolymers of the type employed by the present invention for use in articles that contact food except for articles used for packing or holding food during cooking. Beneficially, the maximum extractable portion as described above will be 2.6 percent in an especially preferred embodiment of the inventive film suitable or use in articles used in packing or holding food during cooking. The above maximum extractable values correspond to current limits for a class of resins intended for use in contact with food as set forth and described by the U.S. Food & Drug Administration in 21 CFR 177.1520 (which description is hereby incorporated in its entirety by reference).

In all of the following examples, the three layer films were prepared by the double or trapped bubble method as broadly described in the aforementioned Pahlke U.S. Pat. No. 3,456,044. In particular, all three layers were simultaneously coextruded, cooled and then reheated for biaxial orientation. Two types of VLDPE were used; Type A was the aforedescribed Attane 4001 manufactured by the Dow Chemical Company of Midland, Mich., and comprising an ethylene and 1-octene copolymer with a density of about 0.912. Type B VLDPE was the aforedescribed Attane 4003, also manufactured by Dow with a density of about 0.905. The ethylene alpha-olefin plastomer used in these examples was the aforementioned Tafmer 4085 with a density of about 0.88, manufactured by Mitsui Petrochemical Industries, Ichihara City Chiba, Japan. In a preferred embodiment of this invention the VLDPE in the outer layers has a density of about 0.905 g/cm$^3$ and the ethylene alpha-olefin copolymer plastomer has a density of about 0.88 g/cm$^3$.

In all of the examples (with the exception of the prior art W. R. Grace films), the overall thickness of the film samples was about 0.70 mils, comprising a first outer layer of about 0.18 mils, a core layer of about 0.34 mils and a second outer layer of about 0.18 mils.

Example 1

In Example 1, various percentages of Tafmer A-4085 were blended with VLDPE to form first and second outer layers on either side of a core layer composed of the same VLDPE material. More particularly, the dry resin outer layer components were first blended by tumble mixing and then fed to a single screw type extruder and either a 60 mm. or 130 mm. diameter die for coextrusion on either side of the VLDPE core resin. The smaller die was used only to prepare Samples 1-4 and 7-9, and the larger die was used to prepare all other samples. The resins were heat plastified and extruded into a primary tube of about 5 inches diameter and about 10 inch wall thickness. The extruder barrel and die temperatures ranged from about 305° to 340° F. (152°-171° C.). The primary tube was cooled to 68°-72° F. and then reheated to about 185°-190° F. for biaxial orientation. The machine direction (MD) orientation ratio was also from about 4 to about 1, and the transverse direction (TD) orientation ratio was from about 4 to 1. Draw point temperature, bubble cooling rates and orientation ratios were adjusted to maximize bubble stability.

Physical and optical properties of the resulting film samples were measured as was the heat sealing range, and the results are summarized in Tables I and J. The heat sealing range was measured to determine and compare the acceptable temperature ranges for heat sealing plastic films. A Sencorp Systems Model 24-AS laboratory sealer manufactured by Sencorp Systems, Inc., Hyannis, Mass. was used. In this test, two four inch wide (T.D. direction) samples are cut from a tubular film. The heat sealer is equipped with controls for time, and seal bar pressure. These controls were set at the following conditions:

1.0 second dwell time
50 psi (345 kPa) jaw pressure

TABLE I

| | Film Properties with VLDPE Type A | | | | | | |
|---|---|---|---|---|---|---|---|
| | Percent Tafmer A-4085 in Outer Layers | | | | | | |
| | 0 | 10 | 15 | 20 | 30 | 35 | 40 |
| | Sample No. | | | | | | |
| | 1 | 2 | 3 | 4 | 5 | 6 | 7 |
| Shrink Force, g/mil (MD/TD) | | | | | | | FILM |
| 90° C. | 113/165 | 89/175 | 84/156 | 107/137 | 140/220 | 135/163 | COULD |
| 20° C. | 50/93 | 32/84 | 27/76 | 42/59 | 40/71 | 45/51 | NOT |
| Shrink, % at 90° C. | | | | | | | BE |
| MD | 20 | 20 | 20 | 25 | 44 | 43 | MADE |
| TD | 29 | 29 | 30 | 34 | 47 | 43 | |
| Tear strength, gms. | | | | | | | |
| MD | 33 | 38 | 28 | 43 | 44 | 38 | |
| TD | 33 | 31 | 27 | 54 | 36 | 31 | |
| Perm. Def, % | | | | | | | |
| MD | 8.8 | 9.1 | 7.4 | 7.2 | 5.3 | 6.3 | |
| TD | 11.6 | 9.9 | 8.5 | 8.4 | 5.9 | 7.1 | |
| Haze, % | 4.9 | 3.2 | 3.0 | 2.6 | 3.7 | 4.1 | |
| Gloss, H.U. | 70.0 | 76.9 | 77.7 | 79.3 | 71.0 | 70.4 | |

TABLE I-continued

| | Film Properties with VLDPE Type A | | | | | | |
|---|---|---|---|---|---|---|---|
| | Percent Tafmer A-4085 in Outer Layers | | | | | | |
| | 0 | 10 | 15 | 20 | 30 | 35 | 40 |
| | Sample No. | | | | | | |
| | 1 | 2 | 3 | 4 | 5 | 6 | 7 |
| Heat Seal Temp./Range, °F. | | | | | | | |
| Initial | 280 | 280 | 270 | 270 | 260 | | |
| Burn Through | 290 | 290 | 290 | 290 | 290 | | |

Referring now to the Example 1 data summarized in Table I, film properties are reported for biaxially oriented heat-shrinkable films prepared with Tafmer A 4085 —VLDPE Type A (density 0.912) blends in the two outer layers with Tafmer contents from 0% to 35%. It should be noted at the onset that shrink force, shrink % and tear strength all declined or did not improve as the Tafmer content was increased from 0% to 15%.

At 40% Tafmer, Sample 7, a primary tube was extruded, but because of the high Tafmer content it could not be blown and biaxially oriented. This was because the outer layers were too soft at the orientation temperature, i.e. the film tensile strength was too low. If cooled slightly below the orientation temperature the extruded tube burst, and if warmed slightly above the orientation temperature the extruded tube developed a small hole.

Table J summarizes film properties for biaxially oriented heat-shrinkable films prepared with Tafmer A 4085-VLDPE Type B (density 0.905) blends in the two outer layers with Tafmer contents from 0% to 35%. Since the VLDPE Type B (density 0.905) has lower tensile strength than VLDPE Type A (density 0.912) in film form, it was obvious that a 40% Tafmer—60% VLDPE Type B outer layer film could not be biaxially oriented. Accordingly, Table J does not include such an experiment.

Comparing shrink percentages, Table I shows that although the 10% and 15% Tafmer blends (Samples 2 and 3) had about the same values, there was a significant and unexpected increase at the 20% Tafmer level (Sample 4) and an even greater improvement at the 30% Tafmer level (Sample 5). By way of illustration, the machine and transverse direction percent shrink values for 30% Tafmer Sample 5 are remarkably about 2.2 and about 1.6 times the corresponding values for the 15% Tafmer Sample 3, respectively. However, the 35% Tafmer Sample 6 had slightly lower percent shrink values than the 30% Tafmer Sample 5, although still much higher than the 15% Tafmer Sample 3 values.

Comparing permanent deformation values, Table I shows that although slightly lower (and improved) values were realized with 20% Tafmer Sample 4 compared to 15% Tafmer Sample 3, there was an unexpected large improvement when the Tafmer content was increased to 30%. More specifically, the machine and transverse direction permanent deformation values for 30% Tafmer sample 5 are respectively about 28% and about 30% lower than the corresponding values for the 15% Tafmer Sample 3. The 35% Tafmer Sample 6 values are considerably higher than the 30% Tafmer Sample 5 permanent deformation values, but still substantially lower than those for 15% Tafmer Sample 3.

Table I also shows that the 30° F. sealing range for 30% Tafmer Sample 5 is substantially wider than the 20° F. range for 15% Tafmer Sample 3.

Comparing tear strength values, Table I demonstrates that substantially higher values were obtained with 20% Tafmer Sample 4 than with 15% Tafmer Sample 3, i.e. the MD was about 1.5 and the TD was about 2 times as high. For 30% Tafmer Sample 5, the MD values was about the same as the 20% Tafmer values whereas the TD tear strength value was substantially lower. For 35% Tafmer Sample 6 both MD and TD values were still lower, but remained above the tear strength values for 15% Tafmer Sample 3.

Summarizing the foregoing, the Table I data of Example 1 demonstrates unexpected improvement in shrink percent, permanent deformation, tear strength and sealing temperature range for heat-shrinkable biaxially oriented three layer films having outer layers comprising a blend of 0.912 density VLDPE and between about 20% and about 35% by weight ethylene alpha-olefin copolymer plastomer of density below about 0.90. Table I also demonstrates that within this range, optimum properties are realized when the ethylene alpha-olefin copolymer plastomer comprises between about 22% and about 30% of the VLDPE blend.

Referring to the Example 1 data summarized in Table J, film properties are reported for biaxially oriented heat-shrinkable films prepared with Tafmer A 4085-VLDPE (density 0.905) blends in the two outer layers with VLDPE contents from 0% to 35%. Tear strength and permanent deformation actually declined as the Tafmer content was increased from 0% to 15%.

Comparing shrink percentages in the 25–35% Tafmer range, all were substantially higher than for the 15% Tafmer Sample 9. For example, the optimum values achieved with 30% Tafmer Sample 11 were remarkably about 1.6 times and 1.3 times the MD and TD values respectively with 15% Tafmer in the VLDPE blend.

Comparing permanent deformation percentages, all of the values in the 25–35% Tafmer range were substantially and desirably lower than with 15% Tafmer Sample 9. For example, the optimum values achieved with 30% Tafmer Sample 11 were remarkably only 58% and 73% of the MD and TD values respectively with 15% Tafmer in the VLDPE blend.

Comparing tear strength values, Table J demonstrates that substantially higher values were obtained with 25–35% Tafmer content as compared with 15% Tafmer. For example, at 35% Tafmer (Sample 12) the tear values in the MD and TD directions were respectively about 1.3 and about 2.2 times the values with the 15% Tafmer Sample 9.

Summarizing, the Table J data of Example 1 also demonstrates unexpected improvement in shrink percent, permanent deformation and tear strength for heat-shrinkable biaxially oriented three layer films having outer layers comprising a blend of 0.905 density VLDPE and between about 20% and about 35% by weight ethylene alpha-olefin copolymer plastomer of density below about 0.90. Table J also demonstrates that within this range, optimum properties are realized when the ethylene alpha-olefin plastomer copolymer comprises between about 22% and about 30% of the VLDPE blend.

Tables I and J demonstrate a preferred embodiment of the invention wherein the film has at least about 30% shrinkage in both the machine and transverse directions and most preferably at least about 40% shrinkage in both the machine and transverse directions.

Tables I and J also demonstrate a preferred embodiment of the invention wherein the film has a permanent deformation of less than about 7% in at least one of the machine and transverse directions, and most preferably a permanent deformation of less than about 6% in both the machine and transverse directions.

TABLE J

| Film Properties with VLDPE Type B | | | | | |
|---|---|---|---|---|---|
| | Percent Tafmer A-4085 in Outer Layers | | | | |
| | 0 | 15 | 25 | 30 | 35 |
| | | | Sample No. | | |
| | 8 | 9 | 10 | 11 | 12 |
| Shrink Force, g/mil (MD/TD) | | | | | |
| 90° C. | NOT RUN | 136/183 | 159/148 | 139/183 | 155/210 |
| 20° C. | NOT RUN | 45/67 | 54/29 | 30/46 | 39/44 |
| Shrink, % at 90° C. | | | | | |
| MD | 26 | 32 | 45 | 53 | 46 |
| TD | 31 | 40 | 48 | 55 | 50 |
| Tear Strength, gms. | | | | | |
| MD | 50 | 25 | 67 | 32 | 32 |
| TD | 47 | 22 | 33 | 21 | 49 |
| Perm. Def. % | | | | | |
| MD | 6.6 | 8.4 | 6.4 | 4.9 | 4.7 |
| TD | 10.6 | 7.7 | 6.6 | 5.6 | 6.6 |
| Haze, % | 2.8 | 3.2 | 4.0 | 3.8 | 3.3 |
| Gloss, H.U. | 72.6 | 72.0 | 69.5 | 70.7 | 69.3 |
| Heat Seal Temp./Range, °F. | | | | | |
| Initial | — | — | — | 260 | 260 |
| Burn Through | — | — | — | 290 | 290 |

0.080 second dwell time. In this particular sealer the jaws are mechanically operated by cams and four heat seal wires are used—two above and two below the film. The film embodiments used were aforedescribed Sample 5 (30% Tafmer 4085-65% 0.912 density VLDPE blend outer layers and same VLDPE core layer), Sample 13 (30% Tafmer 4085-70% 0.912 density VLDPE blend outer layers and 0.905 density VLDPE core layer), and Sample 14 (25% Tafmer 4085-70% 0.912 density VLDPE-5% Antifog blend outer layers and same VLDPE core layer). Each pouch was filled with hot water and hung up overnight. No leakage was found the following morning. This demonstrated that leak-tight seals may be formed between inner layers of the inventive film using conventional impulse heat sealing.

Example 2

In these tests, certain of the aforedescribed three layer film embodiments of the invention were tested in systems of the types commercially used for shrink overwrap packaging of fresh poultry sections on plastic trays, and their performance was compared with commercially employed five layer films.

In each system polystyrene foamed trays about 9 inches long, 6 inches wide and with upwardly and outwardly inclined walls about 1½ inches high were loaded with rubber objects shaped to simulate fresh poultry parts. They were placed in the trays so as to randomly extend about 1 inch above the tray walls. These simulated poultry-loaded plastic trays were carried by a conveyor at various predetermined linear rates into a formed tube of the packaging film. The tubes were fabricated from sheets about 17½ inches wide before stretching, and formed by transversely stretching the film around the simulated poultry-containing trays. The film was pulled around to the bottom of the tray, and the two longitudinal edges were heat sealed to form a continuous tube with the trayed product inside. Recovery on cool down of the transversely stretched film provides a tight wrap around the girth of the package.

In Test 2-A, pouches were made from tubes of the inventive film by forming an impulse heat seal at one end using a laboratory impulse sealer at 55% power and In Test 2-B, tubes formed from the aforementioned Samples 5, 13 and 14 were compared with a commercially employed five layer film manufactured by W. R. Grace & Co.—Conn. and designated SSD-350. The latter film is believed to have the five layer structure EVA/LLDPE/VLDPE/LLDPE/EVA as identified in U.S. Pat. No. 4,617,241. Tubes formed from these films were used to form simulated poultry stretch film packages under the same impulse sealing and 0.080 second dwell time using the aforedescribed laboratory sealer. Seal strengths were measured following the aforedescribed procedure and the results are summarized in Table K.

TABLE K

| | Seal Strength |
|---|---|
| Type Film | Seal Strength (lbs/inch) |
| Sample 5 | 4.30* |
| Sample 13 | 4.40* |
| Sample 14 | 2.63** |
| SSD-350 | 1.88 |

*Film did not include antifog agent
**Film included 5% antifog agent of the non-ionic surfactant type manufactured by Imperial Chemicals Industries and sold as product designation 8112.

Table K demonstrates that under equivalent heat impulse seal conditions, substantially higher seal strengths for shrink overwrap of poultry trayed packages are realized with the inventive film than with a commercially employed five layer film.

In test 2-C, tubes formed from Samples 5, 13 and 14 were used to prepare simulated poultry stretch film trayed packages on a commercial sealing system. This system cuts between the packages, the loose ends downwardly pulled with a vacuum, and folded under the package. The tube end-folded package is fed over a hot plate where sealing pressure is applied. The packaging conditions were 50 packages/minute at a sealing temperature of 265° F. All three film samples provided satisfactory packages from the standpoints of machineability and sealing. It was noted that Samples 5 and 13 (without the aforedescribed antifog agent) needed adjustment of tension because they were slightly tackier than PVC films run on this commercial system under equivalent conditions. Sample 14 (with the aforedescribed antifog agent) appeared to have better machineability, i.e. lower transverse direction stress, due to more slip.

Example 3

In this series of tests, eight different three layer film embodiments of this invention comprising samples 15-21 were prepared by the double bubble method under the following conditions: extrusion die temperature −350° F., orientation temperature 185°-190° F., MD orientation ratio −5:1, TD orientation ratio −4:1. These films having 17½ inches flat width were used to form simulated poultry shrink film trayed packages. Packages were formed using impulse seals at each end. The production rate was about 20 packages per minute, and the inventive films were compared with W. R. Grace five layer commercial film type BDF as Sample 22. This latter film is believed to comprise LLDPE/adhesive/EVOH/adhesive/LLDPE. The operating conditions for the inventive film embodiments were 260° F. conditions for the inventive film embodiments were 260° F. fin seal (i.e. the longitudinal seal between inner layers) and 39%/40% power settings on the impulse seal. The Grace type BDF film required higher temperature settings to achieve adequate sealing, i.e. 360 ° F. on the fin seal and 83%/83% power settings on the impulse seal. About 20 packages were tested with each type film.

Samples 15-21 the VLDPE used in the first and second layer blends as well as the core layer was Dow's type XU61520.01 having a density of about 0.912 g/cm$^3$. Except for lower antioxidant content, it is identical to type 4001. The ethylene alpha-olefin plastomer constituent of the first and second outer layers was Mitsui's Tafmer A-4085 Samples 15-20 include Ampacet Corporation's oleamide-type slip compound No. 10926 in the first and second outer layers, and Sample 20 includes Ampacet Corporation's behenamide-type slip compound No. 100042. Sample 21 includes ICI's type 8112 antifog agent. Samples 15-21 are either 0.6 mils or 0.8 mils total thickness, although the thickness of the three layers varied. The thickness of the prior art five layer film sample 22 was 0.6 mils. The characteristics of film samples 15-22 are summarized in Table L.

TABLE L

| Sample No. | Composition %* | Film Thickness (mils) | Layer Thickness Ratios** |
|---|---|---|---|
| 15 | 68V:29P:3S/V/ 68V:29P:3S | 0.6 | 1/2/1 |
| 16 | 67V:29P:4S/V/ 67V:29P:4S | 0.6 | 1/2/1 |
| 17 | 69V:29P:2S/V/ 69V:29P:2S | 0.6 | 1/2/1 |
| 18 | 69V:29P:2S/V/ 69V:29P:2S | 0.6 | 1/1/1 |
| 19 | 69V:29P:2S/V/ 69V:29P:2S | 0.8 | 3/2/3 |
| 20 | 69V:29P:2S'/V/ 69V:29P:2S' | 0.8 | 3/2/3 |
| 21 | 68V:29P:3A/V/ 68V:29P:3A | 0.6 | 1/1/1 |
| 22 | Prior art five layer film | | |

*V is VLDPE, P is plastomer ethylene alpha-olefin, S is oleamide type slip compound, S' is behenamide type slip compound, and A is antifog compound.
**First outer layer/core layer/second outer layer.

The results of these tests with Samples 15-22 are summarized in Table M. It will be apparent from this data that under equivalent operating conditions, the instant three layer film can be used to form poultry shrink film trayed packages with the same sealing efficiency as the more complicated five layer films presently used, and with considerably lower power requirements.

TABLE M

| | Stretch Shrink Wrap Packaging Performance | |
|---|---|---|
| Sample No. | Percent Good Packages | Percent Good Seals |
| 15 | 95.0 | 97.5 |
| 16 | 100.0 | 100.0 |
| 17 | 100.0 | 100.0 |
| 18 | 100.0 | 100.0 |
| 19 | 70.0 | 85.0 |
| 20 | 85.0 | 92.5 |
| 21 | 100.0 | 100.0 |
| 22 | 90.0 | 95.0 |

Example 4

In this series of tests; an ethylene alpha-olefin copolymer manufactured by Exxon Corporation was added to the first and second outer layers of the aforedescribed three layer film in tube form, the core layer comprising 100% VLDPE (the aforedescribed Dow type XU61520.01). The first and second outer layers were identical in the four Samples 23-26, and comprised blends of the same VLDPE used in the core layer and the ethylene alpha-olefin plastomer copolymer Tafmer A 4085. The Exxon ethylene alpha-olefin copolymer used in these tests was described by the manufacturer as "Exact" type 3010C, and the three layer tubes were made by the same coextrusion double bubble biaxial orientation process used in the previous examples.

The heat sealing range of the heat-shrinkable film Samples 23-26 was determined by measuring the heat seal initiation temperature and the heat seal burn-through temperature. Also, certain physical and optical properties were determined for comparison. The layer thickness were 0.15 mil outer layers and 0.30 mil core layer, so the total film thickness was about 0.60 mil for each Sample. The results of this test series are summarized in Table N (Addition of Exact).

TABLE N

| | Addition of Exact Sample No.[a] | | | |
|---|---|---|---|---|
| | 23 | 24 | 25 | 26 |
| Outer Layers | 68% EVA (90% VA) 29% Plastomer | 68% VLDPE 29% Plastomer | 35% VLDPE 30% Plastomer 32% Exact | 40% VLDPE 30% Plastomer 27% Exact |
| Heat Seal Initiation Temperature (°F.) | 215 | 260 | 225 | 240 |
| Heat Seal Burn-Through Temperature (°F.) | 305 | 295 | 295 | 295 |
| Shrinkage % (90° C.) MD/TD | 32/40 | 37/45 | 45/47 | 36/41 |
| Tear Strength MD/TD, g/mil | 18/25 | 54/51 | 37/39 | 34/35 |
| Haze % | 3.7 | 1.3 | 1.3 | 0.9 |
| Gloss-45° H.U. | 69.1 | 84.5 | 83.0 | 83.2 |

[a]All samples contained 3% slip additive (Ampacet No. 10926) comprising 98% LLDPE and 2% oleamide.

Table N shows that the heat seal initiation temperature may be substantially lowered by the addition of Exact 3010C ethylene alpha-olefin to the outer layers comprising VLDPE—Tafmer type plastomer blends (compare Samples 25 and 26 with Sample 24). The burn-through temperature is not modified so that the net effect is to desirably broaden the heat sealing range. The heat shrinkage is not substantially modified by the addition of Exact 3010C, but the tear strength is significantly reduced.

It will also be noted in Table N that Sample 23 with 68% EVA—29% plastomer—3% slip additive outside layers provides a very wide sealing range (215°-305° F.). However, since it lacks VLDPE in the outer layers, its strength is much lower than VLDPE—containing Samples 24-26 (compare tear strength). Also, its optical properties are inferior because EVA and ethylene alpha-olefin copolymer plastomer do not mix well (compare haze and gloss).

Example 3 demonstrates a hermetically sealed and evacuated food package according to this invention, comprising a tray with a bottom section surrounded by upwardly extending side walls, perishable food supported on the upper surface of the bottom section, and a stretch heat shrink film extending over each said food, the upper edges of the side walls and at least part of the lower surface of the tray bottom section and sealed to itself in flattened relationship against the lower surface so as to form with the tray a hermetically sealed enclosure for the food.

The improvement in this food package comprises a biaxially oriented multilayer composition as the stretched heat shrink film comprising at least a first outer layer, a second outer layer and a core layer between the first and second outer layers which each comprise a blend of between about 20 and about 35 weight % ethylene alpha-olefin plastomer copolymer of density below about 0.90, and between about 65 and about 80 weight % VLDPE of density below about 0.914. The core layer comprises ethylene alpha-olefin copolymer having a higher melting point than the melting point(s) of either of the first and second outer layers.

While the invention has been described as a three layer film, it should be appreciated that the film may have more than three layers. For example, an economic benefit may be realized by recycling trim and scrap to form a five layer structure. In particular, a five layer film can be made wherein the components of the core and the first and second outer layers are as described herein above. Two additional layers, one intermediate the core and each outer layer would be formed at least in part of recycled trim and scrap of the film. Therefore, these intermediate layers would each be composed of a blend of VLDPE and ethylene alpha-olefin plastomer copolymer in a proportion which generally corresponds to the proportion of each component in the entire film. Note however, if the film has been irradiated, the scrap and trim cannot be recycled in this manner.

Further modifications of the invention will be apparent to those skilled in the art and all such modifications are deemed to be within the scope of the invention as defined in the following claims.

What is claimed is:

1. A biaxially oriented heat-shrinkable multilayer stretch film comprising at least a first outer layer, a second outer layer, and a core layer between said first and second outer layers, said first and second outer layers each comprising a blend of between about 20 and about 35 weight % ethylene alpha-olefin plastomer copolymer of density below about 0.90 g/cm$^3$, and between about 65 and about 80 weight % VLDPE of density at least 0.912 and below about 0.914 g/cm$^3$, and said core layer comprising ethylene alpha-olefin copolymer having a higher melting point than the melting point(s) of either of said first and second outer layers.

2. A biaxially oriented heat-shrinkable multilayer stretch film according to claim 1 wherein said ethylene alpha-olefin plastomer copolymer comprises between about 22 and about 30 weight % and said VLDPE comprises between about 70 and 78 weight % of the first and second outer layers blend.

3. A biaxially oriented heat-shrinkable multilayer stretch film according to claim 1 wherein said VLDPE has higher crystallinity than said ethylene alpha-olefin plastomer copolymer.

4. A biaxially oriented heat-shrinkable multilayer stretch film according to claim 1 wherein said ethylene alpha-olefin plastomer copolymer has a density of about 0.88 g/cm$^3$, a melt index of 3.6 g/10 min., an Mw/Mn of about 2.35, and a Vicat softening point of about 54° C.

5. A biaxially oriented heat-shrinkable multilayer stretch film according to claim 1 wherein said ethylene alpha-olefin plastomer copolymer melts at between about 55° C. and about 85° C.

6. A biaxially oriented heat-shrinkable multilayer stretch film according to claim 1 wherein said VLDPE has a crystalline melting point between about 117° C. and about 125° C.

7. A biaxially oriented heat-shrinkable multilayer stretch film according to claim 1 wherein said VLDPE has a yield point and said ethylene alpha-olefin plastomer copolymer does not have a yield point.

8. A biaxially oriented heat-shrinkable multilayer stretch film according to claim 1 wherein said VLDPE has a broader molecular weight distribution than said ethylene alpha-olefin plastomer.

9. A biaxially oriented heat-shrinkable multilayer stretch film according to claim 1 wherein said VLDPE has Mw/Mn of at least about 5.

10. A biaxially oriented heat-shrinkable multilayer stretch film according to claim 1 wherein said ethylene alpha-olefin plastomer has a Mw./Mn below about 2.5.

11. A biaxially oriented heat-shrinkable multilayer stretch film according to claim 1 wherein said ethylene alpha-olefin copolymer plastomer has a Vicat softening point between about 50 ° C. and 65 ° C.

12. A biaxially oriented heat-shrinkable multilayer stretch film according to claim 1 wherein said VLDPE has a Vicat softening point between about 78° C. and about 100° C.

13. A biaxially oriented shrinkable multilayer stretch film according to claim 1 wherein said alpha-olefin plastomer copolymer has density of about 0.88 g/cm$^3$ and said VLDPE has density of about 0.905 g/cm$^3$.

14. A biaxially oriented heat-shrinkable multilayer stretch film according to claim 1 wherein said core layer is a polyolefin.

15. A biaxially oriented heat-shrinkable multilayer stretch film according to claim 1 wherein said core layer is VLDPE.

16. A biaxially oriented heat-shrinkable multilayer stretch film according to claim 1 wherein said core layer is LLDPE.

17. A biaxially oriented heat-shrinkable multilayer stretch film according to claim 1 wherein said core layer is polypropylene.

18. A biaxially oriented heat-shrinkable multilayer stretch film according to claim 1 wherein said core layer is a blend of two different ethylene alpha-olefins.

19. A biaxially oriented heat-shrinkable multilayer stretch film according to claim 1 wherein said core layer is a blend of a lower density ethylene alpha-olefin and a higher density ethylene alpha-olefin.

20. A biaxially oriented heat-shrinkable multilayer stretch film according to claim 1 wherein said film has at least about 30% shrinkage in both the machine and transverse directions.

21. A biaxially oriented heat-shrinkable multilayer stretch film according to claim 1 wherein said film has at least about 40% shrinkage in both the machine and transverse directions.

22. A biaxially oriented heat-shrinkable multilayer stretch film according to claim 1 wherein said film has a permanent deformation of less than about 7% in at least one of the machine and transverse directions.

23. A biaxially oriented heat-shrinkable multilayer stretch film according to claim 1 wherein said film has a permanent deformation of less than about 6% in both the machine and transverse directions.

24. A biaxially oriented heat shrinkable multilayer stretch film according to claim 1 wherein said film is an irradiated film.

25. A biaxially oriented heat shrinkable multilayer stretch film as in claim 1 comprising an intermediate layer between said core layer and each of said outer layers, said intermediate layer comprising a blend of the materials of said core layer and said first and second outer layers.

26. A biaxially oriented heat-shrinkable film according to claim 1 wherein said core layer comprises VLDPE of density about 0.912 g/cm$^3$.

27. A biaxially oriented heat-shrinkable multilayer stretch film comprising at least a first outer layer, a second outer layer, and a core layer between said first and second outer layers, said first and second outer layers each comprising a blend of between about 20 and about 35 wt. % ethylene alpha-olefin plastomer copolymer of density below about 0.90 g/cm$^3$, and between about 65 and about 80 wt. % VLDPE wherein said VLDPE comprises a blend of a first ethylene alpha olefin having a density of about 0.912 g/cm$^2$ and a second ethylene alpha olefin which is a butene comonomer having a density of about 0.900 g/cm$^2$, a melt index of about 3.5, a melting point of about 92° C. and an Mw/Mn ratio of about 2 and said core layer comprises ethylene alpha-olefin copolymers having a high melting point than the melting point of either of each first and second outer layers.

28. A biaxially oriented heat-shrinkable multilayer film according to claim 27 wherein said first ethylene alpha olefin comprises between about 35 and about 40 wt. % and said second ethylene alpha olefin comprises between about 27 and about 32 wt. % of said blend.

29. A biaxially oriented heat-shrinkable multilayer film according to claim 27 wherein said second ethylene alpha olefin is Exact type 3010C/3027.

* * * * *

UNITED STATES PATENT AND TRADEMARK OFFICE
CERTIFICATE OF CORRECTION

PATENT NO. : 5,272,016
DATED : December 21, 1993
INVENTOR(S) : Donald J. Ralph

It is certified that error appears in the above-identified patent and that said Letters Patent is hereby corrected as shown below:

Column 3, line 6, delete "," and insert —.—.

Column 5, line 21, delete "he" and insert —the—.

Column 6, line 30, delete "L" and insert —K—.

Column 6, line 33, delete "K" and insert —L—.

Column 7, line 27, delete "through" and insert —though—.

Column 7, line 28, delete "blow" and insert —blown—.

Column 7, line 29, delete "test" and insert —tests—.

Column 8, line 10, delete "D-882" and insert —D-638—.

Column 8, line 12, delete "D-882" and insert —D-638—.

Column 9, line 50, insert after "Mitsui also" —advises that for comparable density, their Tafmer-type—.

Column 11, line 20, delete "low" and insert —lower—.

Column 12, line 22, delete "(196,000/16,080) and insert —(196,900/16,080)—.

Column 14, line 59, delete "processingn" and insert —processing—.

Column 21, line 52, insert as the first word, —In—.

Signed and Sealed this

Third Day of January, 1995

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,272,016
DATED : December 21, 1993
INVENTOR(S) : Donald J. Ralph

It is certified that error appears in the above-identified patent and that said Letters Patent is hereby corrected as shown below:

Col. 22, last line, after the period, insert --The manufacturer of "Exact" type 3010C, Exxon Corporation now identifies this material as type 3027 and has provided the following information regarding its physical properties: melt index is 3.5 (2kg at 190°C) and density is 0.900 gms/cc. It is an ethylene-butene copolymer, has a single melting point of about 92°C and a Mw/Mn of about 2. Exxon classifies its Exact materials with densities of at least about 0.900 as VLDPE.--

Signed and Sealed this

Twentieth Day of June, 1995

Attest:

BRUCE LEHMAN

*Attesting Officer*     *Commissioner of Patents and Trademarks*